United States Patent
Georgakis

(10) Patent No.: US 12,246,461 B2
(45) Date of Patent: Mar. 11, 2025

(54) SHAVING SYSTEMS AND METHODS

(71) Applicant: BIC Violex Single Member S.A., Anoixi (GR)

(72) Inventor: Georgios Georgakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 286 days.

(21) Appl. No.: 17/997,342

(22) PCT Filed: May 5, 2021

(86) PCT No.: PCT/EP2021/061803
§ 371 (c)(1),
(2) Date: Oct. 27, 2022

(87) PCT Pub. No.: WO2021/239414
PCT Pub. Date: Dec. 2, 2021

(65) Prior Publication Data
US 2023/0173700 A1    Jun. 8, 2023

Related U.S. Application Data

(60) Provisional application No. 63/029,946, filed on May 26, 2020.

(51) Int. Cl.
*B26B 21/40* (2006.01)
*B26B 21/52* (2006.01)
(Continued)

(52) U.S. Cl.
CPC ...... *B26B 21/4056* (2013.01); *B26B 21/4062* (2013.01); *B26B 21/521* (2013.01);
(Continued)

(58) Field of Classification Search
CPC . B26B 21/4056; B26B 21/521; B26B 21/526; B26B 21/4062; H02J 50/001; H02J 17/0048; H02N 2/186
(Continued)

(56) References Cited

U.S. PATENT DOCUMENTS

| | | |
|---|---|---|
| 7,100,283 B1 | 9/2006 | Grdodian et al. |
| 8,763,256 B2 | 7/2014 | Gratsias et al. |

(Continued)

FOREIGN PATENT DOCUMENTS

| | | |
|---|---|---|
| KR | 20130003242 U | 6/2013 |
| WO | 2017121623 A1 | 7/2017 |

OTHER PUBLICATIONS

International Search Report and Written Opinion issued in International Application No. PCT/EP2021/061803 on Aug. 19, 2021 (10 pages).

(Continued)

*Primary Examiner* — Omar Flores Sanchez
(74) *Attorney, Agent, or Firm* — Bookoff Mc Andrews, PLLC

(57) ABSTRACT

A shaver, comprising a handle body, a cartridge coupled to the handle body, the cartridge including a skin care treatment head, a transducer configured to generate electrical energy from mechanical energy, thermal energy, sound or acoustic waves, magnetic field and/or radiofrequency energy; and a battery configured to receive electrical energy generated by the transducer.

20 Claims, 1 Drawing Sheet

(51) Int. Cl.
  *H02J 7/00* (2006.01)
  *H02J 50/00* (2016.01)
  *H02N 2/18* (2006.01)

(52) U.S. Cl.
  CPC .......... *B26B 21/526* (2013.01); *H02J 7/0048* (2020.01); *H02J 50/001* (2020.01); *H02N 2/186* (2013.01)

(58) Field of Classification Search
  USPC ........................................................ 30/34.05
  See application file for complete search history.

(56) References Cited

U.S. PATENT DOCUMENTS

| | | |
|---|---|---|
| 9,216,516 B2 | 12/2015 | Rees et al. |
| 2004/0261270 A1* | 12/2004 | Daryanani ............ B26B 21/526 30/34.05 |
| 2009/0223056 A1 | 9/2009 | Wilson et al. |
| 2015/0246454 A1 | 9/2015 | Mintz et al. |
| 2017/0305023 A9 | 3/2017 | Ball et al. |
| 2018/0354147 A1* | 12/2018 | Goldfarb ................ B26B 21/56 |
| 2021/0187769 A1* | 6/2021 | Kopelas ............... B26B 21/222 |
| 2022/0091648 A1* | 3/2022 | Rolion ................. G06F 3/0442 |
| 2024/0083050 A1* | 3/2024 | Antonakis ............. B26B 21/405 |
| 2024/0171093 A1* | 5/2024 | Kang .................... H02N 2/186 |

OTHER PUBLICATIONS

Zhengbao Yang et al, High-Performance Piezoelectric Energy Harvesters and their Applications, Joule 2, 642-697 (Apr. 18, 2018).

\* cited by examiner

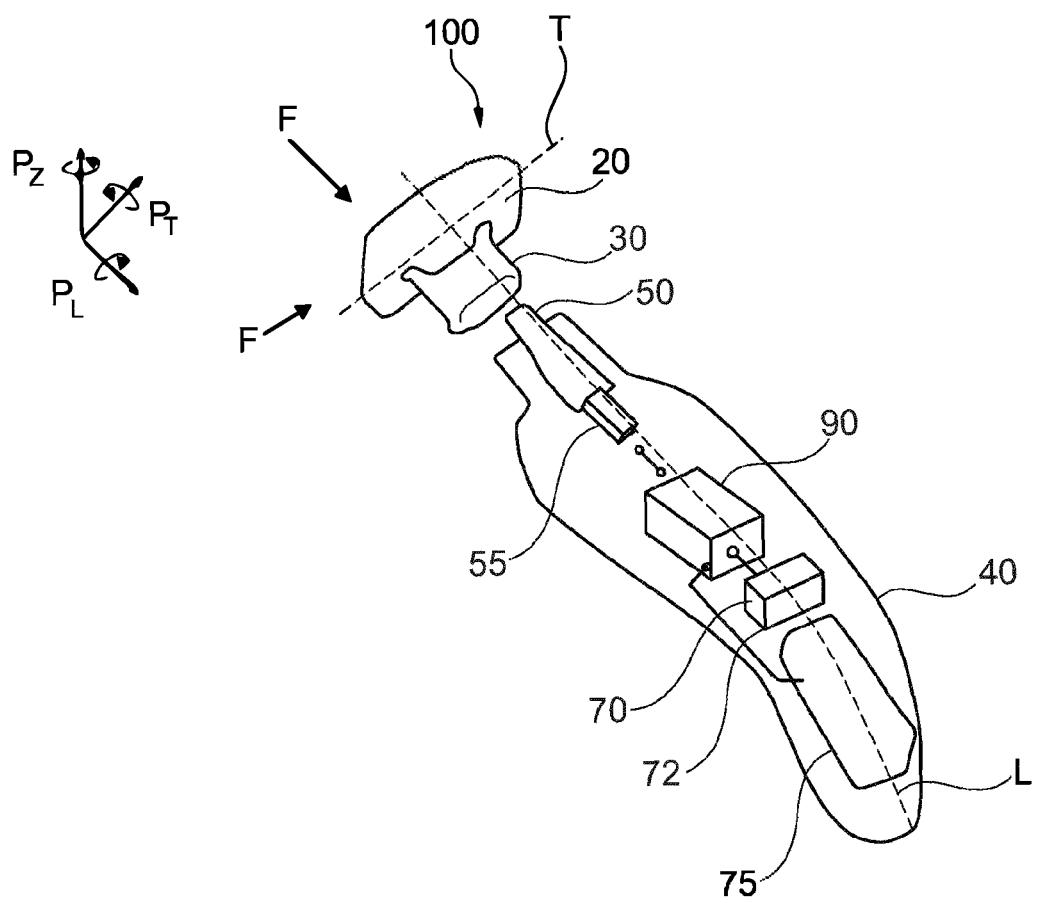

SHAVING SYSTEMS AND METHODS

CROSS-REFERENCE TO RELATED APPLICATION(S)

This application is a National Stage Application of International Application No. PCT/EP2021/061803, filed on May 5, 2021, now published as WO 2021/239,414 A1, which claims benefit from US Provisional U.S. 63/029,946, filed on 26 May 2020, its content being incorporated herein.

FIELD

Aspects of the present disclosure relate generally to shavers, and, specifically, to embodiments of shavers utilizing an energy harvester, which transforms energy from one state to another, and stores the energy for use in the shaver, or for distribution to other devices.

BACKGROUND

Shavers generally include a handle and a razor cartridge attached to one end of the handle. The razor cartridge may include at least one blade for shaving hair. The user holds the handle and repeatedly moves the razor across an area of the body to be shaved, e.g., the face, until hair is removed from the surface of the body.

Electric-powered shavers are convenient to use for users, and may incorporate additional features such as electronic tracking, lights, monitoring of shave progress during shaving, and so forth. However, electric-powered shavers require charging and attendance to ensure the device is able to function properly when needed. Further, these devices consume electricity, resulting in an increased environmental impact and decreased environmental sustainability. Energy is a crucial element of everyday life, and thus, there exists a need to reuse and recapture energy to reduce environmental and cost impacts.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range +/−10%.

The background description provided herein is for the purpose of generally presenting the context of the disclosure. Unless otherwise indicated herein, the materials described in this section are not prior art to the claims in this application and are not admitted to being prior art, or suggestions of the prior art, by inclusion in this section.

SUMMARY

In aspects, a shaver is provided. The shaver comprises a handle body; a razor cartridge coupled to the handle body, the cartridge including a skin care treatment head. The shaver further comprises a transducer configured to generate electrical energy from mechanical energy, thermal energy, sound or acoustic waves, magnetic field and/or radiofrequency energy; and a battery configured to receive electrical energy generated by the transducer.

Embodiments of the present disclosure may address some of the aforementioned issues, as well as others, by implementing an extra power source or energy harvester, in a shaver, e.g. a wet shaver or an electrical shaver. The extra power source or energy harvester is formed by the transducer configured to generate electrical energy from mechanical energy, thermal energy, sound and/or acoustic waves, magnetic field and/or radiofrequency energy; and the battery configured to receive electrical energy generated by the transducer. The energy harvester may recycle energy generated by use of the shaver and transform the harvested energy into e.g. electrical power that can be utilized e.g. for the electric shaver in case of an electric shaver or for other applications in case of a wet shaver. This provides for smaller energy consumption particularly over the lifetime of the shaver, which positively impacts the environment e.g. by reducing electricity consumption from the grid. This also includes less time required to recharge e.g. the electric shaver or a wet shaver, resulting in an improved customer experience through a plug, forget, and play device. In scenarios where electricity is scarce, such as when the user does not have access to a power plug, the electric shaver can operate outside of the electricity grid, making it portable without a need to recharge by plugging into an electrical power source. In examples, a wet shaver that does not need electricity to work may be provided with an USB port so that the harvested energy may be used for charging other devices thereby transforming the wet shaver into a "charger" for devices such as e.g. a mobile phone, a tablet or any other device that can be charged through a USB port.

Embodiments of the shaver disclosed herein may capture energy created from: 1) vibration of the shaver during shaving, 2) motion of a pusher element of the shaver during shaving, 3) a change of a magnetic field of a pusher magnet, 4) pressure on the handle or handle body during shaving, 5) motion of the handle, i.e. accelerometer measurements, 6) light, 7) temperature, and/or 8) sound vibrations that can be transduced or transformed into electrical energy. This is accomplished, for example, through an energy harvester within the shaver that transforms the different types of energy into electrical energy and sends the generated electrical energy for storage in an energy storage device such as a battery that may be provided in the shaver or externally. In examples, it is contemplated that the harvested energy may directly power one or more electronic systems of the shaver itself, including for example, directly powering one or more sensors, processors, transmitters, or the like. In examples, as mentioned above, the harvested energy may be used for charging a further device, e.g. through adding a USB port to the shaver and connecting the further device to the shaver.

Embodiments of the present disclosure include systems and methods configured to transform energy generated during use of a shaver, e.g. an electric or a wet shaver, into usable electrical energy. In examples, a shaver utilizes the transducer to convert one form of energy, e.g. mechanical, magnetic, kinetic, or the like to another form or energy such as electrical. Transducers that function as energy harvesters are connected to a battery for storing the electrical energy generated by the transducer. The transducer may be a mechanically connected device that harvests electrical energy from the displacement of components present in the shaver, e.g. a pusher element in the shaver resulting from the vibrations, temperature, light, sound and/or movement of the shaver. The transducer may also be wirelessly connected through sensors for magnetic field or radio frequency change, for example, via a coil in proximity to a moving magnet element contained within the shaver. A processor and/or antenna of a PCB control unit may be connected to the transducer for generating radio frequency signals. The radio frequency signals may be used by the shaver to communicate with an external electronic device, such as, for example, a cell phone, computer, server, or the like. In embodiments, the shaver may use radio frequency or other wireless signals to transmit data collected by one or more sensors of the shaver. Accordingly, mechanical energy may be transformed by the harvester into electrical energy and controlled by a processing unit to direct use of the electricity depending on the user needs, including but not limited to for example, storage and/or powering of the device itself. The radio frequency signals generated may also be used to charge other electronic devices, e.g., a mobile phone or other device configured to be charged by radio frequency signals in addition to the electric shaver. Shavers disclosed herein may also be recharged by other wireless mechanism, such as for example Qi charging or other inductive charging mechanisms. In examples, shavers disclosed herein may be used to charge other devices configured to be charged by Qi charging or other inductive charging mechanisms.

BRIEF DESCRIPTION OF THE FIGURES

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings:

FIG. 1 depicts an exemplary shaving device of the present disclosure.

DETAILED DESCRIPTION

Reference will now be made in detail to the exemplary embodiments of the present disclosure described below and illustrated in the accompanying drawings. Wherever possible, the same reference numbers will be used throughout the drawings to refer to same or like parts.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring to FIG. 1, there is shown an exemplary shaver 100 in accordance with the principles of the present disclosure. Shaver 100 includes a shaving head or razor cartridge 20 and a handle 40 or handle body e.g., a hollow or partially hollow handle or handle body. The handle 40 has a proximal portion and a distal portion coupled to razor cartridge 20. Shaver 100 has a longitudinal axis L along which the largest/longest dimension of handle 40 extends. Razor cartridge 20 has a front face and carries one or more blades with cutting edges thereof in appropriate positions for effective shaving. Transverse axis T of razor cartridge 20 is substantially parallel to the cutting edges, and also is perpendicular to the longitudinal axis L. A connection assembly 30 couples handle 40 with razor cartridge 20. Razor cartridge 20 may be a disposable cartridge formed for ready attachment to and detachment from handle 40, and for replacement with a new cartridge 20. In embodiments, razor cartridge 20 may not detach from handle 40. While a razor cartridge is described in this particular embodiment, other skin care treatment heads are contemplated in this disclosure, for example, a skin care treatment head may be a sponge or other skin contact element for applying soap and/or an exfoliating treatment to the skin.

The connection assembly 30 is configured and dimensioned so that razor cartridge 20 can move about and along multiple axes. Thus, razor cartridge 20 is able to pivot forward and backward, i.e. a pitching/pivoting movement about a pivot axis $P_T$ that may be parallel to transverse axis T with respect to razor handle 40. Razor cartridge 20 may also pivot about a pivot axis $P_L$ that may be parallel to longitudinal axis L or a pivot axis $P_Z$ that may be perpendicular to both transverse axis T and longitudinal axis L. Razor cartridge 20 may also be compressed and retracted, such that razor cartridge moves towards and away from handle 40, i.e. along longitudinal axis L or along a direction parallel to longitudinal axis L. These movements occur when forces F are applied to razor cartridge 20, typically during use of the shaver. For example, when a force is applied to the cutting edge of the razor, razor cartridge 20 may be pushed towards handle 40, and a biasing element, such as leaf-spring arms, is compressed, resulting in a cushioning motion. The biasing element, e.g., leaf-springs biases razor cartridge 20 back into a rest position after the external forces are removed, returning razor cartridge 20 to a rest position with respect to handle 40. The configuration and dimensions of the connector assembly 30 may permit movement of razor cartridge 20 towards handle 40 against the biasing element to effect cushioning or rolling motions of razor cartridge 20.

Thus, as will be appreciated, razor cartridge 20 and handle 40 are coupled together to permit movement of razor cartridge 20 with respect to handle 40 about and along more than one axis. In accordance with one aspect not necessary to achieve other aspects, the biasing element may be provided separate and/or spaced apart from the connector assembly. Such a separation of these components permits the biasing element and the connector assembly to function independently. Thus, the function of the biasing element is unaffected by the position or orientation of razor cartridge 20 with respect to handle 40.

Handle 40 may be any suitable length (e.g. axis z) and circumference (e.g. axes x and y), and may be otherwise shaped and configured for easy grasp by a user. Those skilled in the art will recognize that suitable length and cross-sectional dimensions of the razor handle portion may vary over a wide range. Because handle 40 may be hollow or partially hollow, a minimum wall thickness of handle 40 may be sufficient to provide handle 40 with some rigidity and will depend upon the characteristics of the material or materials from which handle 40 is formed as well as the cross-sectional shape of handle 40. It will be appreciated that the cross-sectional shape of handle 40 need not be completely symmetrical, and may be at least partially asymmetrical or contoured ergonomically, for example, to conform to the shape of a user's hand or fingers.

The longitudinal direction L may be curved or include one or several straight portions. In the present case, the longitudinal direction L is curved, with a concavity which is constantly directed toward the underside of the handle, i.e. the side of the handle which faces substantially the same direction as the front face of the shaving head.

The shaver 100 may further include, for instance on the top side of the handle, i.e. the side of the handle which faces opposite the front face of razor cartridge 20, an actuating member which enables actuation of e.g. a PCB control circuit 70 mounted inside the handle 40, for controlling the generation of vibrations in the shaver and the frequency of these vibrations. An actuating member may be, for example, a button rotatably or linearly mounted on handle 40 around an axis of rotation $P_Z$ substantially perpendicular to the longitudinal axis L. The actuating member is movable between one or more predetermined positions and may actuate the PCB control circuit, which in turn controls an electric vibrator for generating vibrations and for transmitting them to the handle. The PCB control circuit may include several resistive devices and a switch connected to the actuating member. The PCB control circuit may be mounted e.g. in series, with a DC motor in a supply circuit which supplies the DC motor with electricity from a battery 75. The resistive devices may have different resistance values for enabling variations in the speed and rotation of the DC motor. Thus, shaver 100 according to the present disclosure may be a vibrating shaver that is configured to recapture at least some of the energy used to vibrate shaver 100 during use.

Shaver 100 may further include a pusher element 50 comprising a pusher 55 mounted at or adjacent to the distal end of handle 40. The pusher may extend along longitudinal axis L. Pusher element 50 may have a main body mounted in a corresponding recess formed in the distal portion of handle 40, and diametrically opposed transversal arms which project laterally from the main body and which are received in respective lateral slots formed in the longitudinal side walls of the handle 40 (not shown). Pusher 55 is slideable with respect to handle 40 along longitudinal axis L, between a first position in which the pusher 55 is at a first distance from an energy harvesting transducer 90, and a second position in which the pusher 55 is at a second distance from the energy harvesting transducer 90 different from the first distance and closer to energy harvesting transducer 90.

Pusher element 50 may further comprise a return spring mounted in compression between pusher 55 and razor cartridge 20, so as to bias pusher element 50 towards the first position. More precisely, the return spring may have a bottom end which is mounted onto a pin and a plate, and a top end which is mounted on a bottom pin of pusher element 50, the pins thereby together forming spring guiding means.

Shaver 100 may also include an energy harvesting transducer element 90 for transforming energy applied to shaver 100 into electrical energy. The transducer element 90 may be operably connected to a battery 75. Battery 75 may be configured to receive the electrical energy/current generated by the transducer element 90. This energy/current may be transmitted by wireless, e.g., RF signal or other signal or by direct wired connection to battery 75. Alternatively, or in addition, transducer element 90 may be operably connected to a processor or sensor on PCB Control 70, and/or to a radio frequency signal generator 72. Thus, transducer 90 may be configured to 1) charge battery 75 for future energy usage and/or 2) provide electrical energy directly to various electronic components of shaver 100.

Transducer element 90 may be configured to convert vibration, kinetic energy, deformation energy, or other types of energy into electrical energy. For example, the transducer element 90 may be an inertial linear resonant energy harvester comprising a piezoelectric element and a flexible beam structure such as a cantilever. The piezoelectric element may consist of any suitable material including crystalline materials, ceramics, semiconductors, and/or polymers.

In embodiments, the piezoelectric element may be mounted on the fixed end of the cantilever. The non-fixed end of the cantilever may be connected to pusher element 50, such that movement of pusher element 50 along the longitudinal direction L against the non-fixed end of the cantilever creates stress on the piezoelectric element, resulting in a generated electrical current.

The transducer 90 may also be a nonlinear energy harvester capable of harvesting energy from broadband or frequency-varying excitations utilizing a multi-cantilever structure, a bistable composite plate design, passive and active stiffness-tuning technologies, and the like. For example, the transducer 90 may incorporate a Duffing oscillator system including a magnetic elastic cantilever beam wherein piezoelectric elements are attached to a fixed end of the magnetic elastic cantilever beam, and wherein magnets are mounted near the non-fixed end of the magnetic elastic cantilever beam. In embodiments, pusher 55 is in contact with the elastic beam, such that when pusher 55 contacts the elastic beam, for example, when pusher 55 is depressed during shaving and causes the beam to vibrate, electrical current is generated. In embodiments, the mere movement of shaver 100, for example, before and during shaving may be sufficient to generate electricity via one or more magnets.

In examples, a nonlinear broadband energy harvester with rotatable magnets may be used. For example, an elastic cantilever beam may be used. The elastic cantilever beam may have a fixed end with piezoelectric elements. Magnet elements may further be attached to the non-fixed tip end of the elastic cantilever beam. Rotatable magnets may further be mounted near the non-fixed end of the beam. When pusher 55 contacts elastic beam and causes the elastic beam to vibrate, electrical current is generated. Also contemplated are systems with multiple beams with magnets attached at the tips, such that the magnets induce a nonlinear repulsive force between the beams.

In examples, alternatively or in addition to the transducer systems above, a transducer 90 may also include a linear permanent magnet generator. A magnet may be mounted in handle 40 that is movable along longitudinal axis L. In embodiments, the pusher 55 may itself be a magnet, or pusher 55 may otherwise be coupled to or include a magnet. Transducer 90 may include a stationary copper coil or the like surrounding the travel path of the magnet incorporated with pusher 55. As the razor cartridge 20 is moved by a user, relative to body 40, along longitudinal axis L or in a direction parallel to longitudinal axis L, the magnet (i.e., pusher 55) moves back and forth along the axis L. As a result, the changing magnetic field caused by movement of the magnet in a linear direction generates a current in the copper wire via the Faraday effect, resulting in harvestable electrical energy. In embodiments, transducer 90 may include stationary copper wire surrounding the path of a magnet that is movable along a direction parallel to axis T, such that movement of the shaver in a direction parallel to the axis T will generate electricity as mentioned above.

In embodiments, electrical energy may be generated by a user applying pressure to the handle 40 during use. For example, one or more walls of handle 40 may be made of a compressible material, e.g., a semi-rigid polymer, rubber, or the like that includes a piezoelectric layer. When pressure is applied to the compressible material portion of the handle during shaving, a compression force is applied to the piezoelectric layer, generating electrical energy. In embodiments, the handle may include a trigger, such that when the trigger is compressed, the piezoelectric layer is also compressed, resulting in electrical energy being generated. In examples, the trigger may be connected to a cantilever system substantially as discussed herein for generating current.

In embodiments, an energy harvester or transducer utilizing a thermoelectric effect may be used in shaver 100. For example, the energy harvester may utilize a temperature differential achieved when the user is gripping shaver 100 to generate electricity by the Seebeck or thermoelectric effect. In embodiments, an energy harvester or transducer may include an antenna for radio frequency harvesting, generating electricity by capturing various radio frequency signals transmitted from, e.g., radio, TV, Wi-Fi, cell phones, and the like.

Transducer 90 may be configured to charge battery 75 before, during, and after use of shaver 100. For example, while shaver 100 is not in use, transducer 90 may be charging battery 75 by harvesting energy. For example, when transducer 90 utilizes vibration or otherwise utilizes movement of pusher 55, transducer 90 may be capturing energy during the transport of shaver 100, e.g., while in a user's luggage or garment. In embodiments, shaver 100 also may include the battery 75 or power indicator that displays a status of battery 75. The indicator may display information by, e.g., a display or colored LEDs, to indicate the status of battery 75. For example, the indicator may indicate that battery 75 has enough energy to power all electronics of shaver 100, only some of the electronics of shaver 100, or none of the electronics of shaver 100. When battery 75 has enough energy to power only some of the electronics of shaver 100, the indicator may indicate which of the electronics have sufficient energy for operation. For example, the indicator may indicate that battery 75 has enough energy to perform data collection, e.g., enough energy to operate a sensor, but not enough energy to transmit the data to an external electronic device.

One or more methods of operating shaver 100 may include protocols for purposeful user-induced charging of battery 75 before use of shaver 100. For example, the indicator may indicate to a user that battery 75 does not have sufficient energy to perform one or more functions of shaver 100. In such an example, shaver 100 may provide instructions to the user or the user may be aware of such instructions to perform a physical activity with shaver 100 to enable transducer 90 to produce enough energy to charge battery 75 to a state where one or more previously unavailable functions are now capable of being carried out. For example, shaver 100 may instruct a user to shake, rotate, gyrate, flick, or otherwise move shaver 100 in a repetitive fashion, for a certain period of time, e.g., from 5 seconds to 1 minute or more, greater than 5 seconds, less than 10 seconds, less than 20 seconds, less than 30 seconds, less than 1 minute, less than 5 minutes, or another suitable period of time, or until a notification is given to the user that a battery 75 has been sufficiently charged. In embodiments, the user may be instructed to vigorously shake or move shaver 100 along longitudinal axis L e.g., when pusher 55 includes a magnet as described herein, or to shake or move shaver 100 along transverse axis T. Shaver 100 may provide an audio, visual e.g., activating an LED, or haptic notification, or another suitable notification such as, e.g., a push notification to a user's mobile device when shaver 100 has been sufficiently charged.

As is evident from the figures and text presented above, as well as the examples below, a variety of embodiments are contemplated:

1. A shaver, comprising: a handle body; a cartridge coupled to the body, the cartridge including a skin care treatment head; a transducer configured to generate electrical energy from mechanical energy, thermal energy, sound or acoustic waves, magnetic field and/or radiofrequency energy; and a battery configured to receive electrical energy generated by the transducer.

2. The shaver of embodiment 1, wherein the mechanical energy is generated by vibration or motion of the shaver.

3. The shaver of embodiment 1 or 2, further comprising: a pusher element operably connected to the cartridge and the transducer, the pusher element being movable relative to the handle body; and an accelerometer configured to capture the mechanical energy generated by the motion of the pusher and/or the motion of the shaver, wherein the accelerometer is configured to transfer the captured energy to the transducer.

4. The shaver of embodiment 3, further including a magnet coupled to the pusher element, wherein the transducer is configured to generate electrical energy from a magnetic field generated by motion of the magnet.

5. The shaver of any one of embodiments 1-4, wherein the mechanical energy is generated by an external pressure applied to an outer surface of the handle.

6. The shaver of any one of embodiments 1-5, wherein the transducer includes a piezoelectric element.

7. The shaver of any one of embodiments 1-6, further including one or more electronic components coupled to the battery.

8. The shaver of any one of embodiments 1-7, wherein the one or more electronic components are configured to receive electrical energy from the battery and/or directly from the transducer.

9. The shaver of any one of embodiments 1-8, further including an indicator configured to provide a status of the battery.

10. The shaver of any one of embodiments 1-9, further including a notification element configured to provide a notification of a change in a status of the battery.

11. The shaver of embodiment 10, wherein the notification element is configured to provide an audio, visual, or haptic notification upon the change in the status of the battery.

12. The shaver of any one of embodiments 1-11, further including a USB port configured to be connected to an additional electronic device to transfer the generated electrical energy to the additional electronic device.

13. The shaver of any one of embodiments 1-12, wherein the skin care treatment head comprises one or more blades, exfoliation head, sponge, or soap.

All technical and scientific terms used herein have the same meaning as commonly understood to one of ordinary skill in the art to which this disclosure belongs unless clearly indicated otherwise. As used herein the singular forms "a", "an", and "the" include plural references unless the context clearly dictates otherwise. Thus, for example, reference to "a sensor" may include a plurality of such sensors and reference to "the sensor" may include reference to one or more sensors and equivalents thereof known to those skilled in the art, and so forth.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A shaver, comprising:
    a handle body;
    a razor cartridge coupled to the handle body, the cartridge including a skin care treatment head; and
        a transducer configured to generate electrical energy from mechanical energy, thermal energy, sound or acoustic waves, magnetic field and/or radiofrequency energy; and
        a battery configured to receive the electrical energy generated by the transducer.

2. The shaver of claim 1, wherein the mechanical energy is generated by vibration or motion of the shaver during use.

3. The shaver of claim 1, further comprising:
    a pusher operably connected to the cartridge and the transducer, the pusher being movable relative to the handle body; and
    an accelerometer configured to capture the mechanical energy generated by the motion of the pusher and/or the motion of the shaver, wherein the accelerometer is configured to transfer the captured energy to the transducer.

4. The shaver of claim 3, further including a magnet coupled to the pusher, wherein the transducer is configured to generate electrical energy from a magnetic field generated by motion of the magnet.

5. The shaver of claim 1, wherein the mechanical energy is generated by an external pressure applied to an outer surface of the handle body.

6. The shaver of claim 1, wherein the transducer includes a piezoelectric element.

7. The shaver of claim 1, further including at least one of a sensor, processor, or transmitter coupled to the battery.

8. The shaver of claim 7, wherein the at least one of a sensor, processor, or transmitter is configured to receive electrical energy from the battery and/or directly from the transducer.

9. The shaver of claim 1, further including an indicator configured to provide a status of the battery.

10. The shaver of claim 1, further including a notification element configured to provide a notification of a change in a status of the battery.

11. The shaver of claim 10, wherein the notification element is configured to provide an audio, visual, or haptic notification upon the change in the status of the battery.

12. The shaver of claim 1, further including a USB port.

13. The shaver of claim 1, wherein the skin care treatment head comprises one or more blades, an exfoliation head, a sponge, and/or soap.

14. The shaver of claim 1, wherein the mechanical energy used by the transducer to produce energy, originates by a physical activity of the user.

15. The shaver of claim 1, wherein a connector assembly couples the handle body with the razor cartridge, the connector assembly being configured to and dimensioned so that the razor cartridge is able to move about and along multiple axes.

16. The shaver of claim 15, wherein a biasing element configured to bias the razor cartridge back into a rest position with respect to the handle body after use is provided spaced apart from the connector assembly.

17. The shaver of claim 1, further including an actuating member configured to enable actuation of a PCB control circuit mounted inside the handle body, the PCB control circuit configured to control generation and frequency of vibrations in the shaver.

18. The shaver of claim 1, wherein one or more walls of the handle body are made of a compressible material including a piezoelectric layer such that when pressure is applied to the compressible material during shaving a compression force is applied to the piezoelectric layer thereby generating electrical energy.

19. A method of harvesting energy from a shaver, wherein the method comprises:
    providing a shaver according to claim 1; and
    moving the razor cartridge with respect to the handle body.

20. The method of claim 19, further comprising providing protocols for purposeful user-induced charging of battery before using the shaver thereby providing instructions to the user to perform a physical activity with the shaver to enable the transducer to produce energy to charge the battery.

* * * * *